United States Patent
Leske et al.

(10) Patent No.: US 9,210,378 B2
(45) Date of Patent: Dec. 8, 2015

(54) CONTROLLING ACCESS TO MEETINGS

(71) Applicant: Google Inc., Mountain View, CA (US)

(72) Inventors: Matthew John Leske, Stockholm (SE); David Scrymgeour Bennett, Snohomish, WA (US); Chris Paul David Johnson, San Bruno, CA (US)

(73) Assignee: Google Inc., Mountian View, CA (US)

( * ) Notice: Subject to any disclaimer, the term of this patent is extended or adjusted under 35 U.S.C. 154(b) by 39 days.

(21) Appl. No.: 14/167,545

(22) Filed: Jan. 29, 2014

(65) Prior Publication Data

US 2015/0215580 A1     Jul. 30, 2015

(51) Int. Cl.
*H04M 3/42* (2006.01)
*H04M 11/00* (2006.01)
*H04M 1/00* (2006.01)
*H04L 12/16* (2006.01)
*H04Q 11/00* (2006.01)
*H04N 7/14* (2006.01)
(Continued)

(52) U.S. Cl.
CPC .. *H04N 7/15* (2013.01); *H04M 3/56* (2013.01)

(58) Field of Classification Search
CPC ........... G01S 5/0072; G04N 2007/145; G04N 5/272; G04N 7/14; G04N 7/141; G04N 7/142; G04N 7/144; G04N 7/147; G04N 7/148; G04N 7/15; G04N 7/152; G04N 7/155; G04N 7/157; H04M 1/72572; H04M 2201/40; H04M 2203/2072; H04M 2203/2094; H04M 2203/5054; H04M 2250/52; H04M 3/42; H04M 3/42221; H04M 3/42246; H04M 3/42348; H04M 3/4936; H04M 3/5191; H04M 3/56; H04M 3/562; H04M 3/563; H04M 3/564; H04M 3/565; H04M 3/566; H04M 3/567; H04M 3/568; H04M 7/006; H04M 7/15; H04M 7/146; H04L 12/18; H04L 12/1813; H04L 12/581; H04L 65/403; H04L 67/24; H04W 4/18; H04W 4/185
USPC .......... 348/14.01, 14.02, 14.03, 14.04, 14.05, 348/14.06, 14.07, 14.08, 14.09, 14.1, 14.11, 348/14.12, 14.13, 14.14, 15.15, 14.16; 379/265.03; 455/414.1, 566; 704/270
See application file for complete search history.

(56) References Cited

U.S. PATENT DOCUMENTS 5,483,588 A * 1/1996 Eaton et al. .............. 379/202.01
7,583,657 B1 * 9/2009 Webster et al. ............... 370/352
(Continued)

FOREIGN PATENT DOCUMENTS

WO     20080124373     10/2008

OTHER PUBLICATIONS

European Patent Office; International Search Report and Written Opinion related PCT/US2015/012320; mailing date Mar. 9, 2015; 13 Pages.

*Primary Examiner* — Khai N Nguyen
(74) *Attorney, Agent, or Firm* — IP Spring

(57) ABSTRACT

Implementations generally relate to controlling access to meetings. In some implementations, a method includes determining a locked state of a meeting, wherein, in the locked state, the meeting is restricted to a first set of users. The method further includes changing the meeting to an unlocked state based on one or more predetermined unlock criteria, wherein, in the unlocked state, the meeting is open to the first set of users and to a second set of users. The method further includes changing the meeting back to the locked state based on one or more predetermined lock criteria.

17 Claims, 3 Drawing Sheets

(51) Int. Cl.
*H04N 7/15* (2006.01)
*H04M 3/56* (2006.01)

(56) References Cited

U.S. PATENT DOCUMENTS

| | | |
|---|---|---|
| 8,599,723 B1 | 12/2013 | Hecht |
| 2002/0091769 A1* | 7/2002 | Drozdzewicz et al. ....... 709/204 |
| 2002/0122391 A1* | 9/2002 | Shalit ........................... 370/260 |
| 2003/0026407 A1* | 2/2003 | Ernstrom et al. ......... 379/207.02 |
| 2004/0028199 A1* | 2/2004 | Carlson ...................... 379/93.21 |
| 2004/0028200 A1* | 2/2004 | Carlson ..................... 379/201.01 |
| 2004/0199580 A1* | 10/2004 | Zhakov et al. ................. 709/204 |
| 2007/0067387 A1* | 3/2007 | Jain et al. ...................... 709/204 |
| 2008/0256182 A1* | 10/2008 | Sekaran et al. ............... 709/204 |
| 2009/0089683 A1* | 4/2009 | Thapa ........................... 715/756 |
| 2012/0182384 A1* | 7/2012 | Anderson et al. .......... 348/14.09 |
| 2013/0058473 A1* | 3/2013 | de Jong .................... 379/202.01 |
| 2013/0108033 A1* | 5/2013 | Buzdugan ................ 379/202.01 |

* cited by examiner

CONTROLLING ACCESS TO MEETINGS

BACKGROUND

Video conferencing is often used in business settings, and enables participants to participate in virtual meetings in real-time across geographically dispersed locations. To set up a meeting, a meeting organizer typically provides meeting invitees with a conference dial-in number and a conference code. Each invitee can join the meeting by dialing in using the dial-in number and entering the conference code when prompted.

SUMMARY

Implementations generally relate to controlling access to meetings. In some implementations, a method includes determining a locked state of a meeting, where, in the locked state, the meeting is restricted to a first set of users. The method further includes changing the meeting to an unlocked state based on one or more predetermined unlock criteria, where, in the unlocked state, the meeting is open to the first set of users and to a second set of users. The method further includes changing the meeting back to the locked state based on one or more predetermined lock criteria.

With further regard to the method, in some implementations, the first set of users includes one or more internal users. In some implementations, the second set of users includes one or more external users. In some implementations, the one or more predetermined unlock criteria include receiving an unlock indication from a meeting participant to change the meeting to the unlocked state. In some implementations, the one or more predetermined unlock criteria include a determination that at least one invitee to the meeting is a user from the second set of users. In some implementations, the method further includes determining that at least one invitee to the meeting is a user from the second set of users, and prompting a meeting participant to provide an unlock indication to change the meeting to the unlocked state. In some implementations, the method further includes determining that at least one invitee to the meeting is a user from the second set of users, and prompting a meeting participant to provide an unlock indication to change the meeting to the unlocked state, where the meeting is changed to the unlocked state upon receiving the unlock indication from the meeting participant. In some implementations, the one or more predetermined lock criteria include receiving a lock indication from a meeting participant to change the meeting back to the locked state. In some implementations, the one or more predetermined lock criteria include a determination that the invitees who are users from the second set of users have joined the meeting. In some implementations, the one or more predetermined lock criteria include a determination that a predetermined amount of time has passed since the meeting began.

In some implementations, a method includes determining a locked state of a meeting, where, in the locked state, the meeting is restricted to a first set of users, where the first set of users includes one or more internal users. The method further includes changing the meeting to an unlocked state based on one or more predetermined unlock criteria, where, in the unlocked state, the meeting is open to the first set of users and to a second set of users, where the second set of users includes one or more external users, and where the one or more predetermined unlock criteria include receiving an unlock indication from a meeting participant to change the meeting to the unlocked state. The method further includes changing the meeting back to the locked state based on one or more predetermined lock criteria, where the one or more predetermined lock criteria include receiving a lock indication from a meeting participant to change the meeting back to the locked state.

In some implementations, a system includes one or more processors, and logic encoded in one or more tangible media for execution by the one or more processors. When executed, the logic is operable to perform operations including: determining a locked state of a meeting, where, in the locked state, the meeting is restricted to a first set of users; changing the meeting to an unlocked state based on one or more predetermined unlock criteria, where, in the unlocked state, the meeting is open to the first set of users and to a second set of users; and changing the meeting back to the locked state based on one or more predetermined lock criteria.

With further regard to the system, in some implementations, the first set of users includes one or more internal users. In some implementations, the second set of users includes one or more external users. In some implementations, the one or more predetermined unlock criteria include receiving an unlock indication from a meeting participant to change the meeting to the unlocked state. In some implementations, the one or more predetermined unlock criteria include a determination that at least one invitee to the meeting is a user from the second set of users. In some implementations, the logic when executed is further operable to perform operations including determining that at least one invitee to the meeting is a user from the second set of users, and prompting a meeting participant to provide an unlock indication to change the meeting to the unlocked state. In some implementations, the logic when executed is further operable to perform operations including determining that at least one invitee to the meeting is a user from the second set of users, and prompting a meeting participant to provide an unlock indication to change the meeting to the unlocked state, where the meeting is changed to the unlocked state upon receiving the unlock indication from the meeting participant. In some implementations, the one or more predetermined lock criteria include receiving a lock indication from a meeting participant to change the meeting back to the locked state. In some implementations, the one or more predetermined lock criteria include a determination that the invitees who are users from the second set of users have joined the meeting.

DETAILED DESCRIPTION

Implementations described herein control access to meetings. In various implementations, a system determines a locked state of a meeting. In various implementations, in the locked state, the meeting is restricted to a first set of users, where the first set of users includes one or more internal users (e.g., users internal to the organization hosting the meeting). The method further includes changing the meeting to an unlocked state based on one or more predetermined unlock criteria. In some implementations, in the unlocked state, the meeting is open to the first set of users and to a second set of users, where the second set of users includes one or more external users, or "public" users (e.g., users external to the organization hosting the meeting). The method further includes changing the meeting back to the locked state based on one or more predetermined lock criteria.

As described in more detail below, in various implementations, the system may lock and unlock a given meeting in response to a lock and unlock indication from a meeting participant. In various implementations, the system may automatically lock and unlock a given meeting, without need for user action, based on one or more predetermined lock criteria and unlock criteria.

Figure 1:
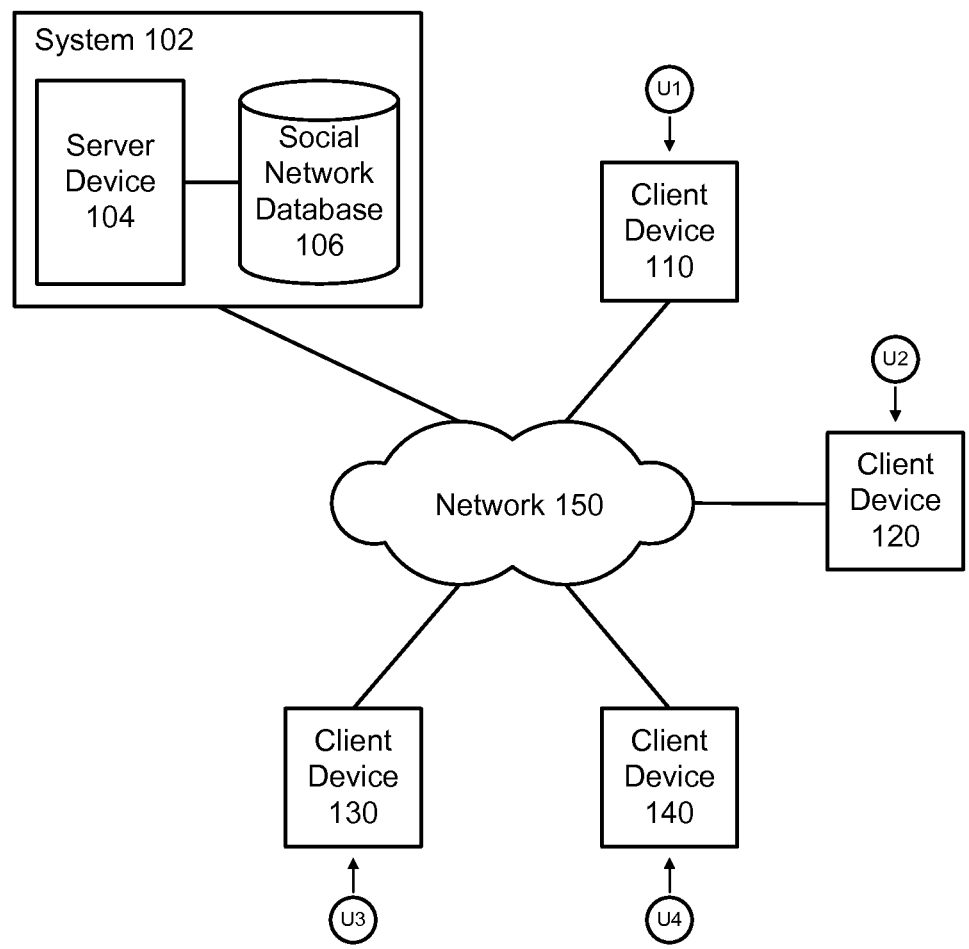
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other in a multi-user video conference, where respective client devices 110, 120, 130, and 140 transmit media streams to each other.

In the various implementations described herein, processor of system 102 causes the elements described herein (e.g., access lists, media streams, etc.) to be displayed in a user interface on one or more display screens.

Implementations described herein may apply to various types of meetings. For example, such meeting may include video conferences, multi-way video call, telephonic conferences, etc.

As described in more detail below, in various implementations, system 102 may lock and unlock a given meeting in response to a lock and unlock indication from a meeting participant. For example, in some implementations, system 102 may determine a default locked state of a meeting. System 102 may enable a meeting participant (e.g., meeting leader) to override the default lock state of the meeting, and initiate the unlocking of the meeting to allow external users (e.g., public users) to join the meeting.

As described in more detail below, in various implementations, system 102 may automatically lock and unlock a given meeting, without the need for user action, based on one or more predetermined lock criteria and unlock criteria. For example, system 102 may determine a default locked state of a meeting. System 102 may determine that a meeting participant (e.g., meeting leader) has invited one or more external users (e.g., public users) to the meeting. System 102 may automatically unlock the meeting. System 102 may then subsequently lock the meeting (e.g., after the external users have joined the meeting, after a predetermined time period, etc.)

Figure 2:
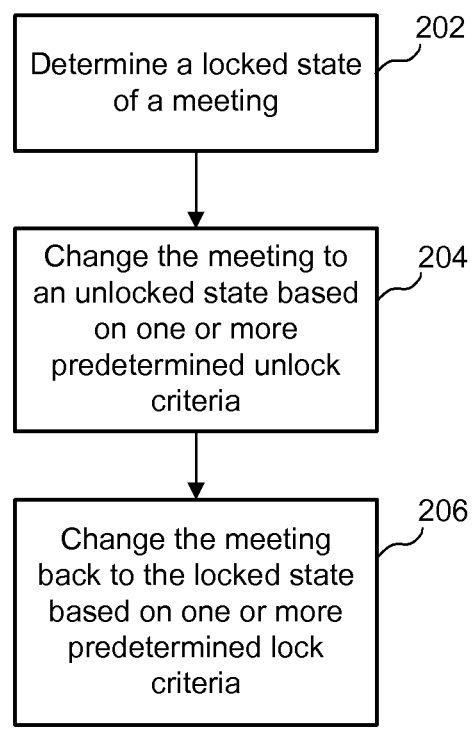
FIG. 2 illustrates an example simplified flow diagram for controlling access to meetings, according to some implementations.

FIG. 2 illustrates an example simplified flow diagram for controlling access to meetings, according to some implementations. Referring to both FIGS. 1 and 2, a method is initiated in block 202, where system 102 determines a locked state of a meeting. In various implementations, in the locked state, the meeting is restricted to a first set of users. In various implementations, the first set of users includes one or more internal users. For example, such internal users may be users that are internal to an organization hosting the meeting.

In some implementations, the locked state is a default locked state that is applied to multiple meetings. For example, the default locked state may be applied ahead of time across all meetings in a department, or all meeting in an organization, etc. In some implementations, the locked state is a default locked state that is set by an administrator, information technology (IT) administrator, security personal, etc. In conventional systems, an external user after legitimately receiving a meeting number and access code to a meeting may subsequently provide the meeting number and access code to other external users, who might later attend meetings unauthorized and obtain confidential information. In various implementations, the default locked state provides security to meetings in order to prevent uninvited external users from accessing a meeting and obtaining confidential information.

Because internal users will typically already have access to internal information, in various implementations, system 102 may enable internal users to access locked meetings by default. In some implementations, system 102 may enable internal users to access to locked meetings based on being listed in the access control list (ACL) associated with the meeting. For example, for a given meeting, system 102 may automatically grant access to all internal invitees listed on the ACL. Such implementations be in addition to other implementations described herein.

In block 204, system 102 changes the meeting to an unlocked state based on one or more predetermined unlock criteria. In various implementations, in the unlocked state, the meeting is open to the first set of users and to a second set of users. In various implementations, the changing of the meeting to the unlocked state includes overriding the detected locked state. In some implementations, the first set of users is different from the second set of users. For example, as indicated herein, in various implementations, the first set of users includes one or more internal users (e.g., users internal to the organization hosting the meeting), and the second set of users includes one or more external users (e.g., users external to the organization hosting the meeting). The second set of users may be referred to as public users. In some implementations, the second set of users may include some internal users. For example, in some scenarios, a particular internal group may be working on a highly confidential project that is sensitive enough to keep within that internal group. As such, in some implementations, system 102 may associate users in that particular group as the first set of users and associate all other users internal and external with the second set of users.

In some implementations, where the one or more predetermined unlock criteria may include receiving an unlock indication from a meeting participant to change the meeting to the unlocked state. For example, system 102 may provide the meeting participant with an unlock indication button that the user can select to provide the unlock indication. For example, the unlock indication button may be a button with an image of a lock or with text indicating a lock button. System 102 may enable the user may toggle the button between unlock and lock. The particular button and/or image and/or text may vary and will depend on the particular implementation.

In such scenarios, system 102 enables the meeting participant to override the default locked state for the particular meeting. In some implementations, the meeting participant providing the unlock indication may be the meeting organizer. In some implementations, the meeting participant providing the unlock indication may be any meeting participant who is from the first set of users (e.g., any internal user). In some implementations, after the meeting is unlocked, system 102 enables one or more meeting participants to invite external users (e.g., from the second set of users) to the meeting.

In some implementations, the one or more predetermined unlock criteria may include a determination that at least one invitee to the meeting is a user from the second set of users. System 102 may analyze each invitation to join the meeting to determine whether each invitee is an internal user or an external user. For example, in some implementations, a given invitee's email address may be used to send an invitation. System 102 may determine from the email address if the email address is an internal example address, which would belong to an internal user, or if the email address is an external email address (e.g., outside the domain of the organization hosting the meeting, etc.), which would belong to an external user. In such scenarios, system 102 may change the meeting to an unlocked state without any particular action by the meeting participants. In some implementations, system 102 may notify a meeting participant (e.g., the meeting organizer, etc.) that the meeting is being unlocked. For example, system 102 may display a message such as, "You have invited external people. So, we will unlock the meeting." The particular notification will vary and will depend on the particular implementations.

In some implementations, after system 102 determines that at least one invitee to the meeting is a user from the second set of users, system 102 may prompt a meeting participant (e.g., the meeting organizer or other internal meeting participant) to provide an unlock indication to change the meeting to the unlocked state. For example, system 102 may display a message such as, "There is at least one external invitee. You may want to unlock the meeting." System 102 may provide an unlock button that the user can select." System 102 may also provide an arrow or other visible cue to direct the user's eye to the unlock button. For example, in various implementations, system 102 may cause the unlock button to change color, to flash, etc. System 102 may then change the meeting to the unlocked state upon receiving the unlock indication from the meeting participant.

As such, implementations enable an internal user (e.g, host user of the meeting, or any trusted participant, etc.) to enable external users (e.g., public users) to conveniently join the meeting. In other words, implementations enable ad hoc expansions of ACLs for meetings. As described herein, the internal user may enable one or more external users to join the meeting using various methods such as sharing a link in invitations. System 102 may transmit such invitations to invitees using any appropriate means such as emails, texts, and/or any suitable social network notifications.

In block 206, system 102 changes the meeting back to the locked state based on one or more predetermined lock criteria. In some implementations, the one or more predetermined lock criteria may include receiving a lock indication from a meeting participant to change the meeting back to the locked state. For example, system 102 may provide the meeting participant with a lock indication button that the user can select to provide the lock indication. For example, the lock indication button may be a button with an image of a lock or with text indicating a lock button. System 102 may enable the user to toggle the button between unlock and lock. In such scenarios, system 102 enables the meeting participant to return the meeting back to the default locked state for the particular meeting. In some implementations, the meeting participant providing the lock indication may be the meeting organizer. In some implementations, the meeting participant providing the lock indication may be any meeting participant who is from the first set of users (e.g., an internal user).

In some implementations, the one or more predetermined lock criteria may include a determination that the invitees who are users from the second set of users have joined the meeting. For example, if there is one invitee who is an external user and that external user has joined the meeting, system 102 may automatically lock the meeting. In some implementations, system 102 may notify a meeting participant (e.g., the meeting organizer, etc.) that the meeting is being locked again. For example, system 102 may display a message such as, "The external meeting participants have joined the meeting. So, we will lock the meeting."

As such, in some implementations, system 102 changes the meeting from the unlocked state back to locked state without requiring action from a meeting participant.

In some implementations, the one or more predetermined lock criteria may include a determination that a predetermined amount of time (e.g., 5 minutes, 10 minutes, 15 minutes, etc.) has passed since the meeting began. For example, system 102 may change the meeting from the unlocked state to the locked state after the predetermined amount of time even if not all invitees from the second set of users have not joined the meeting. In some implementations, system 102 may display a message such as, "The meeting has started and external invitees have not joined the meeting. So, we will lock the meeting again." In such scenarios, system 102 changes the meeting from the unlocked state back to locked state without requiring action from a meeting participant.

In some implementations, the one or more predetermined lock criteria may include a determination that a predetermined portion of the external invitees have joined meeting. For example, in some implementations, the predetermined portion may be a number of external users who have joined the meeting (e.g., 1, 2, 3, etc.). In some implementations, the predetermined portion may be a percentage of external users who have joined the meeting (e.g., 20%, 30%, 40%, 50%, etc.). The particular type of portion (e.g., number, percentage, etc.) will vary depending on the particular implementation.

In some implementations, after determining that a predetermined amount of time has passed since the meeting began, system 102 may prompt a meeting participant to provide a lock indication to change the meeting from an unlocked state back to the locked state. This also provides added security to the meeting. In some implementations, system 102 may display a message such as, "The meeting has started and external invitees have not joined the meeting. You may want to unlock the meeting." System 102 may provide a lock button that the user can select." System 102 may also provide an arrow or other visible cue to direct the user's eye to the lock button. In such scenarios, system 102 changes the meeting from the unlocked state back to locked state based on receiving the lock indication from the meeting participant.

In some implementations, after the meeting is changed back to the locked state, system 102 may enable the second set of users to leave the meeting and reenter the meeting without the meeting having to be unlocked a subsequent time. For example, in some scenarios, the entire meeting may be dropped for various reasons (e.g., bad connection or other technical problem, meeting reset, etc.). In some scenarios, the particular external user may be dropped from the meeting for various reasons (e.g., bad connection or other technical problem, etc.). Because system 102 is aware of the external user being an actual invitee, system 102 may allow that user to reenter the meeting without the need for the meeting to be subsequently changed back to the unlocked state. For example, in some implementations, upon restarting the meeting or upon an external user attempting to rejoin the meeting, system 102 may check any of the external users attempting to rejoin the meeting against the ACL. If the external user or users are listed in the ACL, system 102 may automatically grant access to those external users without needed to unlock the meeting.

In some implementations, if the meeting is locked and an external invitee has attempted but failed to join the meeting, system 102 may reject the external invitee, who may call back (or be put on hold). In some implementations, system 102 may notify the meeting organizer or another trusted, internal meeting participant that an external person just tried to join the call but failed. System 102 may unlock the meeting automatically or by prompting the meeting organizer to unlock the meeting.

In various implementations, system 102 will automatically lock the meeting (e.g., automatically return the meeting back to the locked state) if system 102 automatically unlocked the meeting (e.g., automatically changed the meeting from the default locked state to the unlocked state).

In various implementations, system 102 will prompt a given meeting participant to lock the meeting (e.g., provide a lock indication) if system 102 previously unlocked the meeting based on receiving an unlock indication from the meeting participant.

While some implementations are described herein in the context of video conferences, these implementations and other may also be applied to other forms of meetings such as telephonic calls. Instead of visual cues, system 102 may provide appropriate voice prompts to the user to either unlock or lock the meeting by pressing an appropriate button or series of buttons (e.g., *2, *3, *4, etc.). As such, in various implementations, a user may press a particular series of buttons (e.g., *2) to unlock the meeting. The user may press another particular series of buttons (e.g., *3) to lock the meeting. The particular button or series of buttons for each function (e.g., unlock, lock, etc.) will vary depending on the particular implementation.

Implementations described herein provide various benefits. For example, implementations maintain control of meeting access by external participants. Implementations also enable internal users in a meeting to conveniently add external users to a meeting.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Figure 3:
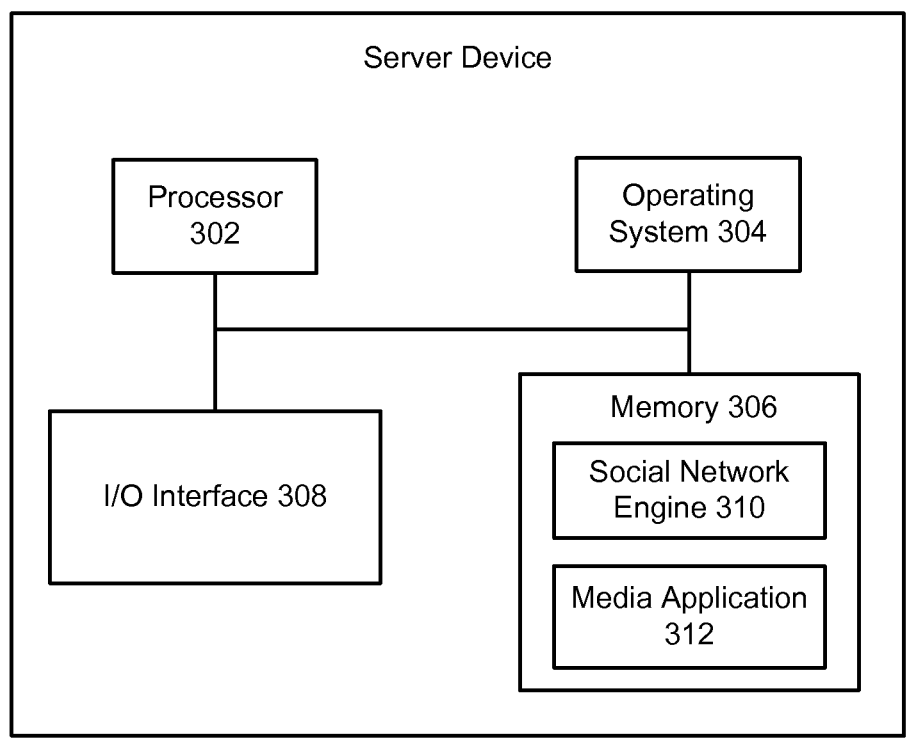
FIG. 3 illustrates a block diagram of an example server device, which may be used to implement the implementations described herein.

FIG. 3 illustrates a block diagram of an example server device 300, which may be used to implement the implementations described herein. For example, server device 300 may be used to implement server device 104 of FIG. 1, as well as to perform the method implementations described herein. In some implementations, server device 300 includes a processor 302, an operating system 304, a memory 306, and an input/output (I/O) interface 308. Server device 300 also includes a social network engine 310 and a media application 312, which may be stored in memory 306 or on any other suitable storage location or computer-readable medium. Media application 312 provides instructions that enable processor 302 to perform the functions described herein and other functions.

For ease of illustration, FIG. 3 shows one block for each of processor 302, operating system 304, memory 306, I/O interface 308, social network engine 310, and media application 312. These blocks 302, 304, 306, 308, 310, and 312 may represent multiple processors, operating systems, memories, I/O interfaces, social network engines, and media applications. In other implementations, server device 300 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A method comprising:
   determining, by a conference server, a locked state of a meeting, wherein, in the locked state, the meeting is restricted to a first set of users, and wherein the first set of users includes one or more internal users;
   changing the meeting to an unlocked state based on one or more predetermined unlock criteria, wherein, in the unlocked state, the meeting is open to the first set of users and to a second set of users, wherein the second set of users includes one or more external users, and wherein the one or more predetermined unlock criteria include receiving an unlock indication from a meeting participant to change the meeting to the unlocked state; and
   changing the meeting back to the locked state based on one or more predetermined lock criteria, wherein the one or more predetermined lock criteria include one or more of receiving a lock indication from a meeting participant to change the meeting back to the locked state, determination that one or more invitees who are users from the second set of users have joined the meeting, and a determination that a predetermined amount of time has passed since the meeting began.

2. A method comprising:
   determining, by a conference server, a locked state of a meeting, wherein, in the locked state, the meeting is restricted to a first set of users;
   changing the meeting to an unlocked state based on one or more predetermined unlock criteria, wherein, in the unlocked state, the meeting is open to the first set of users and to a second set of users; and
   changing the meeting back to the locked state based on one or more predetermined lock criteria, wherein the one or more predetermined lock criteria include one or more of a determination that one or more invitees who are users from the second set of users have joined the meeting, a determination that a predetermined amount of time has passed since the meeting began, and wherein the meeting is changed from the unlocked state back to locked state without requiring action from a meeting participant.

3. The method of claim 2, wherein the first set of users includes one or more internal users.

4. The method of claim 2, wherein the second set of users includes one or more external users.

5. The method of claim 2, wherein the one or more predetermined unlock criteria include receiving an unlock indication from a meeting participant to change the meeting to the unlocked state.

6. The method of claim 2, wherein the one or more predetermined unlock criteria include a determination that at least one invitee to the meeting is a user from the second set of users.

7. The method of claim 2, wherein the method further comprises:
   determining that at least one invitee to the meeting is a user from the second set of users; and
   prompting a meeting participant to provide an unlock indication to change the meeting to the unlocked state.

8. The method of claim 2, wherein the method further comprises:
   determining that at least one invitee to the meeting is a user from the second set of users; and
   prompting a meeting participant to provide an unlock indication to change the meeting to the unlocked state, wherein the meeting is changed to the unlocked state upon receiving the unlock indication from the meeting participant.

9. The method of claim 2, wherein the one or more predetermined lock criteria include receiving a lock indication from a meeting participant to change the meeting back to the locked state.

10. A system comprising:
    one or more processors; and
    logic encoded in one or more non-transitory computer-readable media for execution by the one or more processors and when executed operable to perform operations comprising:
    determining a locked state of a meeting, wherein, in the locked state, the meeting is restricted to a first set of users;
    changing the meeting to an unlocked state based on one or more predetermined unlock criteria, wherein, in the unlocked state, the meeting is open to the first set of users and to a second set of users; and
    changing the meeting back to the locked state based on one or more predetermined lock criteria, wherein the one or more predetermined lock criteria include one or more of a determination that one or more invitees who are users from the second set of users have joined the meeting, and a determination that a predetermined amount of time has passed since the meeting began.

11. The system of claim 10, wherein the first set of users includes one or more internal users.

12. The system of claim 10, wherein the second set of users includes one or more external users.

13. The system of claim 10, wherein the one or more predetermined unlock criteria include receiving an unlock indication from a meeting participant to change the meeting to the unlocked state.

14. The system of claim 10, wherein the one or more predetermined unlock criteria include a determination that at least one invitee to the meeting is a user from the second set of users.

15. The system of claim 10, wherein the logic when executed is further operable to perform operations comprising:
    determining that at least one invitee to the meeting is a user from the second set of users; and
    prompting a meeting participant to provide an unlock indication to change the meeting to the unlocked state.

16. The system of claim 10, wherein the logic when executed is further operable to perform operations comprising:
    determining that at least one invitee to the meeting is a user from the second set of users; and
    prompting a meeting participant to provide an unlock indication to change the meeting to the unlocked state, wherein the meeting is changed to the unlocked state upon receiving the unlock indication from the meeting participant.

17. The system of claim 10, wherein the one or more predetermined lock criteria include receiving a lock indication from a meeting participant to change the meeting back to the locked state.

* * * * *